Oct. 15, 1929.  J. KIRKEBY  1,731,819

GEAR SHIFTING MECHANISM

Filed Dec. 6, 1928

INVENTOR

John Kirkeby

Patented Oct. 15, 1929

1,731,819

UNITED STATES PATENT OFFICE

JOHN KIRKEBY, OF SAN LUIS OBISPO, CALIFORNIA

GEAR-SHIFTING MECHANISM

Application filed December 6, 1928. Serial No. 324,190.

My invention relates to improvements in gear-shifting mechanisms and the objects of my improvement are to provide an automatic selector device, intended more particularly for use with automatic gear shifting mechanisms for automobiles, of the kind using a small selecting lever on the steering wheel and the actual shifting being accomplished by the movement of the clutch pedal. The first object of the present device is to alternately select second and high gear after second speed has been selected by the operator.

Another object is to provide a mechanism which not only is very simple in itself, but actually simplifies some of the other parts, as it leaves only four positions for the selector lever instead of the usual five and it leaves the lever locked at all times when driving in high gear.

Another object is to eliminate all confusion when driving due to selecting gears, as it leaves only low, neutral and reverse to select.

Still another object which this mechanism accomplishes is to eliminate all confusion which might arise from leaving the car in high gear with the selector lever in neutral position.

I accomplish these objects by the means illustrated in the accompanying drawings in which—

Figure 1:
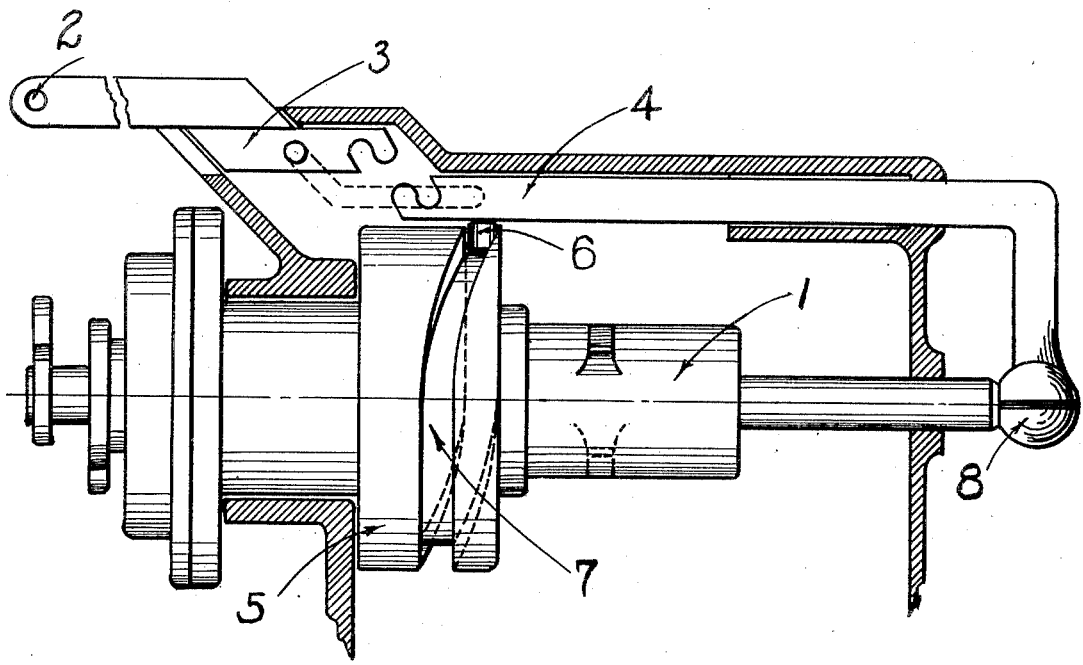
Figure 1 shows a rear view of the mechanism as installed in a car, part in section.

Numeral 1 in Figure 1 may represent the selector element of any automatic gear shifting device of the kind using a small selector lever on the steering wheel while the actual shifting is accomplished by the movement of the clutch pedal.

At numeral 2 is shown the eye to which connection is made with the selector lever.

Parts 3 and 4 are the two parts of a square bar which has a slip joint, by which means the bar separates, making it two parts when withdrawn from the confined part of the channel in which it slides.

Part 3 has a pin through it, projecting outward from each side. This requires a groove in each side of the bar channel. The groove is shown in dotted lines. The said groove and the slanting shape of the left end of part 3 and the shape of the end of the channel through which part 3 projects combine to raise the said part 3 out of the path of part 4 when part 3 is withdrawn to the limit. This position of part 3 is obtained when the lever on the steering wheel is set to the extreme position, which is the position shown in the drawing and is for both high and intermediate gears.

Figure 2:
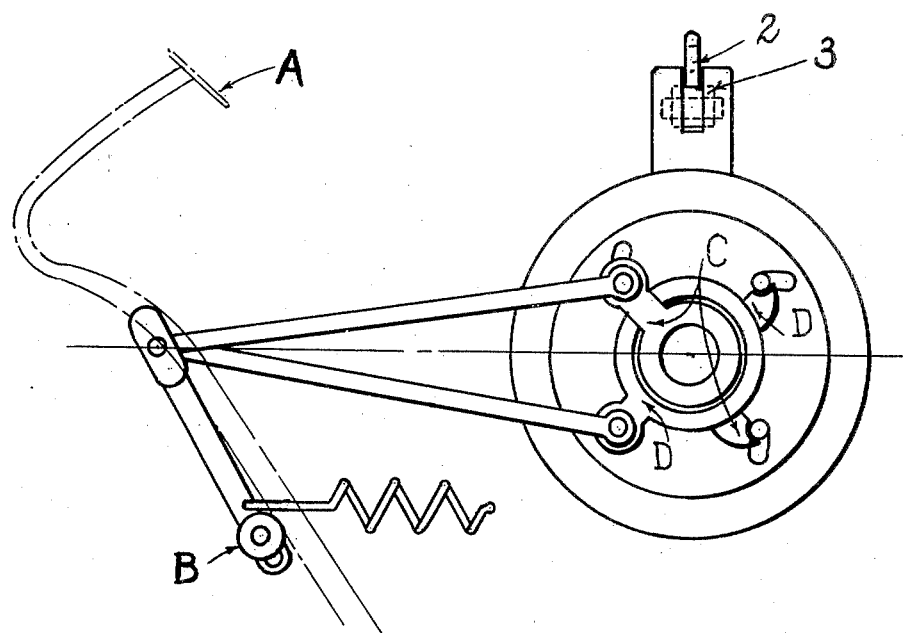
Figure 2 shows a side view of the double acting ratchet mechanism as installed in a car in relation to the clutch pedal, with the clutch pedal shown in dotted lines.

When now the drum 5 is rotated one quarter turn by the extreme forward movement of the clutch pedal through the ratchet mechanism shown in Figure 2, roller 6 attached to part 4 will move said part 4 to the left, guided by groove 7 in the drum 5. This movement of part 4 carries selector element 1 with it by reason of parts 4 and 1 being connected at ball joint 8. This movement of selector element 1 selects high gear, which is engaged by the return movement of the clutch pedal while the drum 5 is turning one quarter turn with the roller 6 following the straight groove.

Groove 7 is shown by the dotted line to be running along the right edge of the drum 5 for one quarter of the circumference with no room for a wall on the right side. Therefore no wall is there and the parts 3, 4 and 1 are free to be moved to the right by means of the selecting lever at practically all times except when the car is running in high gear. In the drawing the roller 6 is shown near the point where the right side wall of groove 7 ends in a point. At this point the roller 6 with the parts 4 and 1 may be moved to the right by the selector lever or it would be moved to the left by the groove 7 if the drum was rotated.

When it is again desired to change gears when running in high gear, the drum 5 is again turned one quarter turn by the extreme forward movement of the clutch pedal as before. On this quarter turn the roller 6 will follow the groove on the other side of the drum, shown by the dotted lines, bringing the selector element back to second gear, which is engaged by the return of the clutch pedal. Thus high and second gears are alternately engaged unless other gears are selected by the operator.

It is obvious that, when driving along in high gear, part 4 is under part 3 and roller 6 is in the inside groove of the drum. This locks both the selector element and part 3. If it is desired in this position to select first gear, reverse or neutral, it is only necessary to depress the clutch pedal to the limit, thereby turning the drum one quarter turn. This moves part 4 to the right by reason of the groove in the drum slanting to the right on this quarter turn. Now part 4 is in the position shown in the drawing and when part 3 is now moved to the right by means of the selector lever, its course is downward to engage with part 4 and may be moved to any position.

The details of the actual shifting of gears is not illustrated here, as having nothing to do with the present idea. Many patents have been issued with the idea of shifting gears by means of the clutch pedal after having been pre-selected by the operator. Some of these shift to neutral and gear selected on the same stroke of the clutch pedal. This automatic selecting mechanism may be adapted for all such.

The aforesaid successive quarter turns of the drum 5 are effected by the alternate forward and backward movements of the clutch pedal through a double acting ratchet mechanism, an example of which is shown in Figure 2, where clutch pedal A strikes roller B near the end of its stroke, operating the two dogs C and D.

The relation of the clutch pedal to the rest of the shifting mechanism is only that roller B is so located that the clutch pedal will strike roller B near the end of the clutch pedal stroke. Roller B is shown near the fulcrum of the lever for operating the ratchet. This arrangement has the effect of using very slight movement of the clutch pedal stroke and it also eliminates the possibility of operating the shifting mechanism inadvertently, by reason of requiring deliberate pressure.

With this selecting device installed in a car with a clutch pedal operated gear shift, the driver's hands may both remain on the steering wheel during all ordinary driving through traffic.

I claim:

1. In a clutch pedal actuated automatic gear shifting device, an automatic selecting mechanism to alternately select high and intermediate gears and to lock the selector element when high gear is used, and comprising a double acting ratchet mechanism, a bar carrying a roller at one end while the other end is linked to the selector element of an automatic gear shifting mechanism, a drum with a groove in its periphery to guide the said roller when the drum is rotated by the movement of the clutch pedal through the double acting ratchet mechanism whereby high and intermediate gears are alternately selected.

2. In a clutch pedal actuated automatic gear shifting device, an automatic selecting mechanism to alternately select high and intermediate gears and to lock the selector element when high gear is used, and comprising a double acting ratchet mechanism, a bar with a slip joint and carrying a roller at one end while the other end is linked to the selector element of an automatic gear shifting mechanism, a drum with a groove in its periphery to guide the said roller when the drum is rotated by the movement of the clutch pedal through the double acting ratchet mechanism whereby high and intermediate gears are alternately selected after second gear has been selected by the operator.

3. In a clutch pedal actuated automatic gear shifting device, an automatic selecting mechanism to alternately select high and intermediate gears and to lock the selector element when high gear is used, and comprising a double acting ratchet mechanism, a bar with a slip joint and carrying a roller at one end while the other end is linked to the selector element of an automatic gear shifting mechanism, a drum with a groove in its periphery to guide the said roller when the drum is rotated by the movement of the clutch pedal through the double acting ratchet mechanism whereby high and intermediate gears are alternately selected, with one part of the jointed bar guided out of the way of the other part of the same, when the selector lever is moved to the extreme position to allow the thus freed part of the bar to be acted upon by the groove in the drum.

4. In a clutch pedal actuated gear shifting mechanism for automobiles a gear selecting mechanism for automatically selecting alternate gears when previously determined by the operator, and comprising a double acting ratchet mechanism, a drum with a groove in its circumference, a sliding rod with a roller so mounted in relation to the said drum that the roller, guided by the groove in the said drum will alternately select gears when the drum is rotated one half turn on each full double stroke of the clutch pedal, through the double acting ratchet mechanism, the aforementioned sliding rod being linked with the selecting element of the gear shifting element.

In witness whereof I hereby affix my signature.

JOHN KIRKEBY.